(No Model.)

J. C. STOCK.
Filter.

No. 237,336. Patented Feb. 1, 1881.

Witnesses:
Charles H. Pell
O. Naundorff

Inventor:
Jas. C. Stock.
By O Drake, Att'y.

UNITED STATES PATENT OFFICE.

JAMES C. STOCK, OF NEWARK, NEW JERSEY.

FILTER.

SPECIFICATION forming part of Letters Patent No. 237,336, dated February 1, 1881.

Application filed May 18, 1880. (No model.)

*To all whom it may concern:*

Be it known that I, JAMES C. STOCK, of Newark, in the county of Essex and State of New Jersey, have invented certain new and useful Improvements in Filters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to inexpensively, and yet for all practical purposes perfectly, filter water in its passage from the faucet, for household purposes.

The invention consists in a collar capable of being secured to the mouth of a faucet, to which is attached means for holding the filtering material into said mouth of the faucet, and in means for adapting said collar to the various sizes of faucets, as will hereinafter be more definitely set forth and illustrated.

Figure 1:
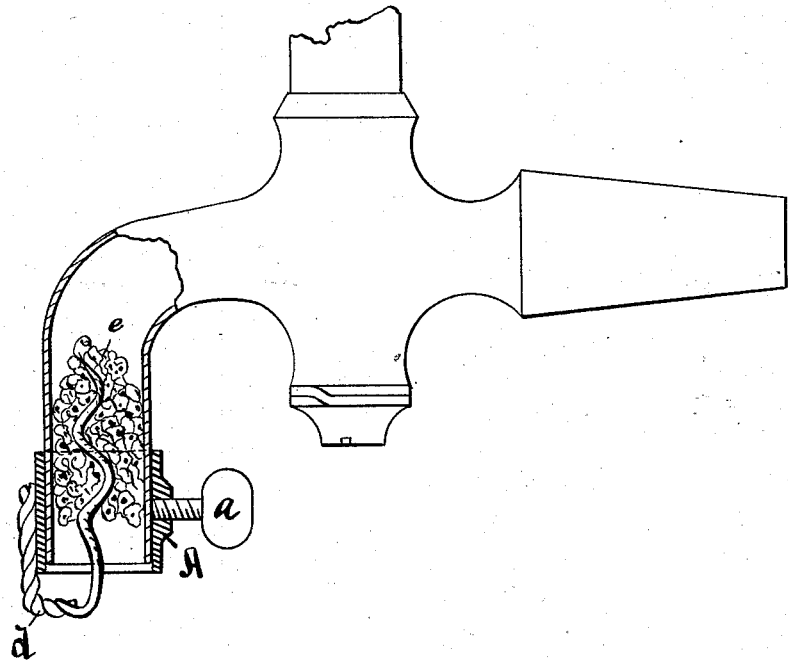
Figure 2:
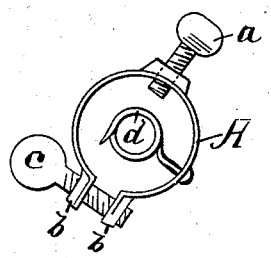

In the accompanying drawings, in which similar letters of reference indicate like parts in each of the several figures, Figure 1 is a side elevation, partially in section, of a faucet to which my invention has been attached, and which clearly shows the relation of the filtering material to the faucet. Fig. 2 is a plan view of the filter with the filtering material removed, showing means whereby the collar may be adjusted to any size of faucet.

In carrying out my invention I construct the collar A, through which the thumb-screw $a$, which fastens it to the faucet, passes, as shown in the figures.

Should it be desired to adapt the collar A to fit any ordinary sizes of faucets, I may separate the ring in the manner shown in Fig. 2, form projecting lips $b$ upon the ends thus made, and pass the thumb-screw $c$ through said lips $b$, and in that manner allow the ring to be enlarged or made smaller, as may be desired. Ordinarily, however, the ring A or collar will be a continuous one.

To the exterior periphery of the ring I solder or otherwise attach the spiral wire $d$, which descends around and reascends into the mouth of the faucet, as shown in Fig. 1, said spiral wire being entwined with and strengthened by a shorter wire, which allows it to be held more firmly in position. Into the mouth of the faucet, and held in place by the spiral wire $d$, above referred to, is thus fastened a sponge or other suitable filtering material, (indicated in Fig. 1 by the letter $e$,) through which the water passes, and is thereby purified.

When the filter becomes fouled by the extraneous substances taken from the water, all that becomes necessary is to remove the collar, and with it the sponge, wash it, and return it to its position in the faucet, which performance will require but a moment's time to complete.

I am aware that various devices have been used in which the faucet appendages have held the filtering material within said appendages; but

What I claim, and wish to have secured by Letters Patent, is—

1. In a filter, the combination of the collar A, capable of being fastened to the faucet, the spiral wire $d$, secured to said collar, and the sponge or other filtering material, arranged substantially as herein shown and described.

2. In a filter, the combination, with the faucet, of the collar A, the spiral wire $d$, the thumb-screws $a$ and $c$, and the filtering material $e$, all arranged and operating substantially as and for the purpose set forth and shown.

In testimony that I claim the foregoing I have hereunto set my hand this 12th day of May, 1880.

JAMES C. STOCK.

Witnesses:
O. DRAKE,
CHARLES H. PELL.